(12) United States Patent
Andreopoulos et al.

(10) Patent No.: US 10,140,551 B2
(45) Date of Patent: Nov. 27, 2018

(54) SCENE UNDERSTANDING USING A NEUROSYNAPTIC SYSTEM

(71) Applicant: International Business Machines Corporation, Armonk, NY (US)

(72) Inventors: Alexander Andreopoulos, San Jose, CA (US); Rathinakumar Appuswamy, San Jose, CA (US); Pallab Datta, San Jose, CA (US); Steven K. Esser, San Jose, CA (US); Dharmendra S. Modha, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/993,482

(22) Filed: May 30, 2018

(65) Prior Publication Data
US 2018/0276502 A1    Sep. 27, 2018

Related U.S. Application Data

(63) Continuation of application No. 15/298,137, filed on Oct. 19, 2016, which is a continuation of application
(Continued)

(51) Int. Cl.
*G06K 9/62* (2006.01)
*G06K 9/52* (2006.01)
(Continued)

(52) U.S. Cl.
CPC ....... *G06K 9/6256* (2013.01); *G06K 9/00718* (2013.01); *G06K 9/00986* (2013.01);
(Continued)

(58) Field of Classification Search
CPC .. G06K 9/4676; G06K 9/6267; G06K 9/6256; G06T 7/2033; G06T 2207/20081;
(Continued)

(56) References Cited

U.S. PATENT DOCUMENTS 4,874,963 A * 10/1989 Alspector .............. G06N 3/063
326/36
5,634,087 A    5/1997 Mammone et al.
(Continued)

FOREIGN PATENT DOCUMENTS

CN    102088597 A    6/2011
CN    102864499 A    1/2013

OTHER PUBLICATIONS

Sima, H. et al., "Color image Segmentation Based on Regional Saliency", Proceedings of the 19th International Conference on Neural Information Processing (ICONIP 2012), Part V, Nov. 12-15, 2012, pp. 142-150, Springer Verlag, Germany.
(Continued)

*Primary Examiner* — Samir Ahmed
(74) *Attorney, Agent, or Firm* — Sherman IP LLP; Kenneth L. Sherman; Hemavathy Perumal

(57) ABSTRACT

Embodiments of the invention provide a method for scene understanding based on a sequence of image frames. The method comprises converting each pixel of each image frame to neural spikes, and extracting features from the sequence of image frames by processing neural spikes corresponding to pixels of the sequence of image frames. The method further comprises encoding the extracted features as neural spikes, and classifying the extracted features.

15 Claims, 11 Drawing Sheets

Related U.S. Application Data

No. 15/133,102, filed on Apr. 19, 2016, now Pat. No. 9,536,179, which is a continuation of application No. 14/289,890, filed on May 29, 2014, now Pat. No. 9,373,058.

(51) Int. Cl.
| | |
|---|---|
| *G06K 9/46* | (2006.01) |
| *H04N 19/136* | (2014.01) |
| *G06N 3/063* | (2006.01) |
| *H04N 9/67* | (2006.01) |
| *G06K 9/00* | (2006.01) |
| *G06K 9/66* | (2006.01) |
| *G06N 3/08* | (2006.01) |
| *G06T 7/246* | (2017.01) |

(52) U.S. Cl.
CPC .......... *G06K 9/46* (2013.01); *G06K 9/4623* (2013.01); *G06K 9/4652* (2013.01); *G06K 9/4661* (2013.01); *G06K 9/4671* (2013.01); *G06K 9/4676* (2013.01); *G06K 9/52* (2013.01); *G06K 9/6267* (2013.01); *G06K 9/66* (2013.01); *G06N 3/0635* (2013.01); *G06N 3/08* (2013.01); *G06T 7/246* (2017.01); *H04N 9/67* (2013.01); *H04N 19/136* (2014.11); *G06T 2207/10016* (2013.01); *G06T 2207/20081* (2013.01)

(58) Field of Classification Search
CPC ........ G06T 2207/10016; G06N 3/0635; G06N 3/08
See application file for complete search history.

(56) References Cited

U.S. PATENT DOCUMENTS

| | | | |
|---|---|---|---|
| 6,018,740 | A | 1/2000 | Ito |
| 6,670,963 | B2 | 12/2003 | Osberger |
| 6,757,666 | B1 | 6/2004 | Thomas |
| 7,398,259 | B2 * | 7/2008 | Nugent .................... G06N 3/08 706/15 |
| 7,636,098 | B2 | 12/2009 | Yang et al. |
| 7,707,128 | B2 | 4/2010 | Matsugu |
| 7,958,071 | B2 | 6/2011 | Snider et al. |
| 8,098,886 | B2 | 1/2012 | Koch et al. |
| 8,311,965 | B2 | 11/2012 | Breitwisch et al. |
| 8,332,340 | B2 | 12/2012 | Snider |
| 8,369,652 | B1 | 2/2013 | Khosla et al. |
| 8,385,654 | B2 | 2/2013 | Gu et al. |
| 8,401,297 | B1 | 3/2013 | Apostolos et al. |
| 8,538,074 | B2 | 9/2013 | Nakamura et al. |
| 8,600,919 | B2 | 12/2013 | Poon |
| 8,626,686 | B1 | 1/2014 | Rhodes |
| 8,699,767 | B1 | 4/2014 | Khosla et al. |
| 8,731,302 | B2 | 5/2014 | Eshima |
| 8,774,498 | B2 | 7/2014 | De Campos |
| 8,907,971 | B2 | 12/2014 | Ballestad et al. |
| 8,972,315 | B2 | 3/2015 | Szatmary |
| 8,977,582 | B2 | 3/2015 | Richert |
| 8,990,130 | B2 | 3/2015 | Alvarez-Icaza Rivera |
| 9,014,467 | B2 | 4/2015 | Hu et al. |
| 9,042,659 | B2 | 5/2015 | Adamek et al. |
| 9,070,039 | B2 | 6/2015 | Richert |
| 9,098,811 | B2 | 8/2015 | Petre et al. |
| 9,104,974 | B2 | 8/2015 | Sim et al. |
| 9,117,176 | B2 | 8/2015 | Szatmary et al. |
| 9,123,127 | B2 | 9/2015 | Richert |
| 9,159,020 | B2 | 10/2015 | Alcarez-Icaza Rivera |
| 9,195,903 | B2 | 11/2015 | Andreopoulos et al. |
| 9,218,563 | B2 | 12/2015 | Szatmary |
| 9,239,985 | B2 | 1/2016 | Piekniewski et al. |
| 9,262,712 | B2 | 2/2016 | Modha |
| 9,355,331 | B2 | 5/2016 | Appuswamy et al. |
| 9,367,798 | B2 | 6/2016 | Coenen et al. |
| 9,418,333 | B2 | 8/2016 | Kim et al. |
| 9,798,972 | B2 | 10/2017 | Appuswamy et al. |
| 9,922,266 | B2 | 3/2018 | Andreopoulos |
| 2002/0154833 | A1 | 10/2002 | Koch et al. |
| 2005/0190966 | A1 | 9/2005 | Etienne-Cummings et al. |
| 2006/0182339 | A1 | 8/2006 | Connell |
| 2008/0089591 | A1 | 4/2008 | Zhou |
| 2008/0201282 | A1 | 8/2008 | Garcia et al. |
| 2010/0172584 | A1 | 7/2010 | Lukac et al. |
| 2010/0241601 | A1 | 9/2010 | Carson et al. |
| 2010/0312730 | A1 | 12/2010 | Weng et al. |
| 2011/0004579 | A1 | 1/2011 | Snider |
| 2012/0011089 | A1 | 1/2012 | Aparin |
| 2012/0109863 | A1 | 5/2012 | Esser |
| 2012/0109864 | A1 | 5/2012 | Modha |
| 2012/0109866 | A1 | 5/2012 | Modha |
| 2012/0173471 | A1 | 7/2012 | Ananthanarayanan et al. |
| 2012/0192048 | A1 | 7/2012 | Suzuki et al. |
| 2012/0259804 | A1 | 10/2012 | Brezzo |
| 2012/0308076 | A1 | 12/2012 | Piekniewski et al. |
| 2013/0018832 | A1 | 1/2013 | Ramanathan et al. |
| 2013/0073493 | A1 | 3/2013 | Modha |
| 2013/0073496 | A1 | 3/2013 | Szatmary |
| 2013/0131985 | A1 | 5/2013 | Weiland et al. |
| 2013/0218821 | A1 * | 8/2013 | Szatmary ................. G06N 3/10 706/25 |
| 2013/0311412 | A1 | 11/2013 | Lazar |
| 2014/0143193 | A1 | 5/2014 | Zheng et al. |
| 2014/0330761 | A1 | 11/2014 | Kim et al. |
| 2015/0139537 | A1 | 5/2015 | Milner et al. |
| 2015/0242690 | A1 | 8/2015 | Richert |
| 2015/0269439 | A1 | 9/2015 | Versace |
| 2015/0278628 | A1 | 10/2015 | Agrawal |
| 2015/0278641 | A1 | 10/2015 | Agrawal |
| 2015/0324684 | A1 | 11/2015 | Alvarez-Icaza Rivera |
| 2015/0339589 | A1 | 11/2015 | Fisher |
| 2015/0379689 | A1 | 12/2015 | Andreopoulos |
| 2016/0004961 | A1 | 1/2016 | Appuswamy et al. |
| 2016/0004962 | A1 | 1/2016 | Appuswamy et al. |
| 2017/0243076 | A1 | 8/2017 | Andreopoulos et al. |
| 2018/0107893 | A1 | 4/2018 | Andreopoulos |

OTHER PUBLICATIONS

Vogelstein, R.J. et al., "A Muitichip Neuromorphic System for Spike-Based Visual Information Processing", Neural Computation, 2007, pp. 2281-2300, vol. 19, Massachusetts Institute of Technology, United States.

Yin, Z. et al., "Likelihood Map Fusion for Visual Object Tracking", Proceedings of the 2008 Winter Workshop on Application of Computer Vision, Mistubishi Electric Research Laboratories, Mar. 2008, pp. 1-9, IEEE, United States.

Yan, W. et al., "Salient Region Detection Algorithm Based on Frequency and Spatial Domain Analysis", Computer Engineering, Sep. 5, 2012, pp. 166-170, vol. 38, No. 17, China (English-language Abstract attached, p. 1).

Andreopoulos, A. et al., "Visual saliency on networks of neurosynaptic cores", Mar. 2015, pp. 1-16, vol. 59, No. 2-3, IBM, United States.

Neftci, E. et al., "Synthesizing cognition in neuromorphic electronic systems", Proceedings of the National Academy of Sciences, Jul. 22, 2013, pp. E3466-E3476, vol. 110, No. 37, United States.

Kwak, N. et al., "Input Feature Selection for Classification Problems", IEEE Transactions on Neural Networks, Jan. 2002, pp. 143-159, vol. 13, No. 1, IEEE, United States.

Tino, P. et al., "Finite State Machines and Recurrent Neural Networks—Automata and Dynamical Systems Approaches", Technical Report: UMIACS-TR-95-1 and CS-TR-3396, 1998, pp. 1-50, Institute for Advanced Computer Studies, College Park, MD.

Borji, A., "State-of-the-Art in Visual Attention Modeling", IEEE Transactions on Pattern Analysis and Machine Intelligence, Jan. 2013, pp. 185-207, vol. 35, No. 1, IEEE Computer Society, United States.

Masquelier, T., et al., "The Timing of Vision—How neural processing links to different temporal dynamics", Frontiers in Psychology, Jun. 30, 2011, pp. 1-14, vol. 2, article 151, United States.

(56) References Cited

OTHER PUBLICATIONS

Han, J. et al., "Efficient, simultaneous detection of multi-class geospatial targets based on visual saliency modeling and discriminative learning of sparse coding", ISPRS Journal of Photogrammetry and Remote Sensing, Jan. 29, 2014, pp. 37-48, vol. 89, Elsevier, Netherlands.
Joo, M. et al., "Face Recognition With Radial Basis Function (RBF) Neural Networks", Proceedings of IEEE Transactions of Neural Networks, May 2002, pp. 697-710, vol. 13, No. 3, IEEE, United States.
U.S. Non-Final Office Action for U.S. Appl. No. 14/322,778 dated Oct. 7, 2016.
U.S. Final Office Action for U.S. Appl. No. 14/322,778 dated May 4, 2017.
U.S. Notice of Allowance for U.S. Appl. No. 14/265,268 dated Jul. 13, 2015.
U.S. Non-Final Office Action for U.S. Appl. No. 14/289,890 dated Oct. 7, 2015.
U.S. Notice of Allowance for U.S. Appl. No. 14/289,890 dated Feb. 19, 2016.
U.S. Corrected Notice of Allowability for U.S. Appl. No. 14/289,890 dated May 10, 2016.
U.S. Non-Final Office Action for U.S. Appl. No. 14/322,776 dated Nov. 30, 2016.
U.S. Final Office Action for U.S. Appl. No. 14/322,776 dated Mar. 9, 2017.
U.S. Advisory Action for U.S. Appl. No. 14/322,776 dated May 2, 2017.
U.S. Notice of Allowance for U.S. Appl. No. 14/322,776 dated Jun. 19, 2017.
U.S. Notice of Allowance for U.S. Appl. No. 14/850,046 dated Jan. 29, 2016.
U.S. Non-Final Office Action for U.S. Appl. No. 15/133,102 dated Jun. 17, 2016.
U.S. Notice of Allowance for U.S. Appl. No. 15/133,102 dated Aug. 26, 2016.
U.S. Advisory Action for U.S. Appl. No. 14/322,778 dated Oct. 20, 2017.
U.S. Non-Final Office Action for U.S. Appl. No. 15/087,945 dated Jun. 23, 2017.
U.S. Final Office Action for U.S. Appl. No. 15/087,945 dated Oct. 11, 2017.
U.S. Notice of Allowance for U.S. Appl. No. 15/087,945 dated Nov. 7, 2017.
U.S. Non-Final Office Action for U.S. Appl. No. 15/298,137 dated Dec. 1, 2017.
U.S. Notice of Allowance for U.S. Appl. No. 15/298,137 dated Mar. 28, 2018.
U.S. Non-Final Office Action for U.S. Appl. No. 14/322,778 dated Mar. 30, 2018.
Indiveri, G. et al., "A Reconfigurable Neuromorphic VLSI Multi-Chip System Applied to Visual Motion Computation," In Microelectronics for Neural, Fuzzy and Bio-Inspired Systems, 1999. MicroNeuro'99. Proceedings of the Seventh International Conference on, pp. 37-44, IEEE, United States.
List of IBM Patents or Patent Applications Treated as Related.
List of IBM Patents or Patent Applications Treated as Related; Andreopoulos, A., U.S. Appl. No. 16/147,106, filed Sep. 28, 2018.

\* cited by examiner

SCENE UNDERSTANDING USING A NEUROSYNAPTIC SYSTEM

This invention was made with Government support under HR0011-09-C-0002 awarded by Defense Advanced Research Projects Agency (DARPA). The Government has certain rights in this invention.

BACKGROUND

The present invention relates to neuromorphic and synaptronic computation, and in particular, scene understanding using a neurosynaptic system.

Neuromorphic and synaptronic computation, also referred to as artificial neural networks, are computational systems that permit electronic systems to essentially function in a manner analogous to that of biological brains. Neuromorphic and synaptronic computation do not generally utilize the traditional digital model of manipulating 0s and 1s. Instead, neuromorphic and synaptronic computation create connections between processing elements that are roughly functionally equivalent to neurons of a biological brain. Neuromorphic and synaptronic computation may comprise various electronic circuits that are modeled on biological neurons.

In biological systems, the point of contact between an axon of a neural module and a dendrite on another neuron is called a synapse, and with respect to the synapse, the two neurons are respectively called pre-synaptic and post-synaptic. The essence of our individual experiences is stored in conductance of the synapses. The synaptic conductance changes with time as a function of the relative spike times of pre-synaptic and post-synaptic neurons, as per spike-timing dependent plasticity (STDP). The STDP rule increases the conductance of a synapse if its post-synaptic neuron fires after its pre-synaptic neuron fires, and decreases the conductance of a synapse if the order of the two firings is reversed.

BRIEF SUMMARY

One embodiment of the invention provides a method for scene understanding based on a sequence of image frames. The method comprises converting each pixel of each image frame to neural spikes, and extracting features from the sequence of image frames by processing neural spikes corresponding to pixels of the sequence of image frames. The method further comprises encoding the extracted features as neural spikes, and classifying the extracted features.

Another embodiment of the invention provides a system for scene understanding based on a sequence of image frames. The system comprises a transduction unit for converting each pixel of each image frame to neural spikes. The system further comprises at least one feature extraction unit for extracting features from the sequence of image frames by processing neural spikes corresponding to pixels of the sequence of image frames. The system further comprises at least one classification unit for encoding the extracted features as neural spikes, and classifying the extracted features.

These and other features, aspects, and advantages of the present invention will become understood with reference to the following description, appended claims, and accompanying figures.

DETAILED DESCRIPTION

Figure 1:
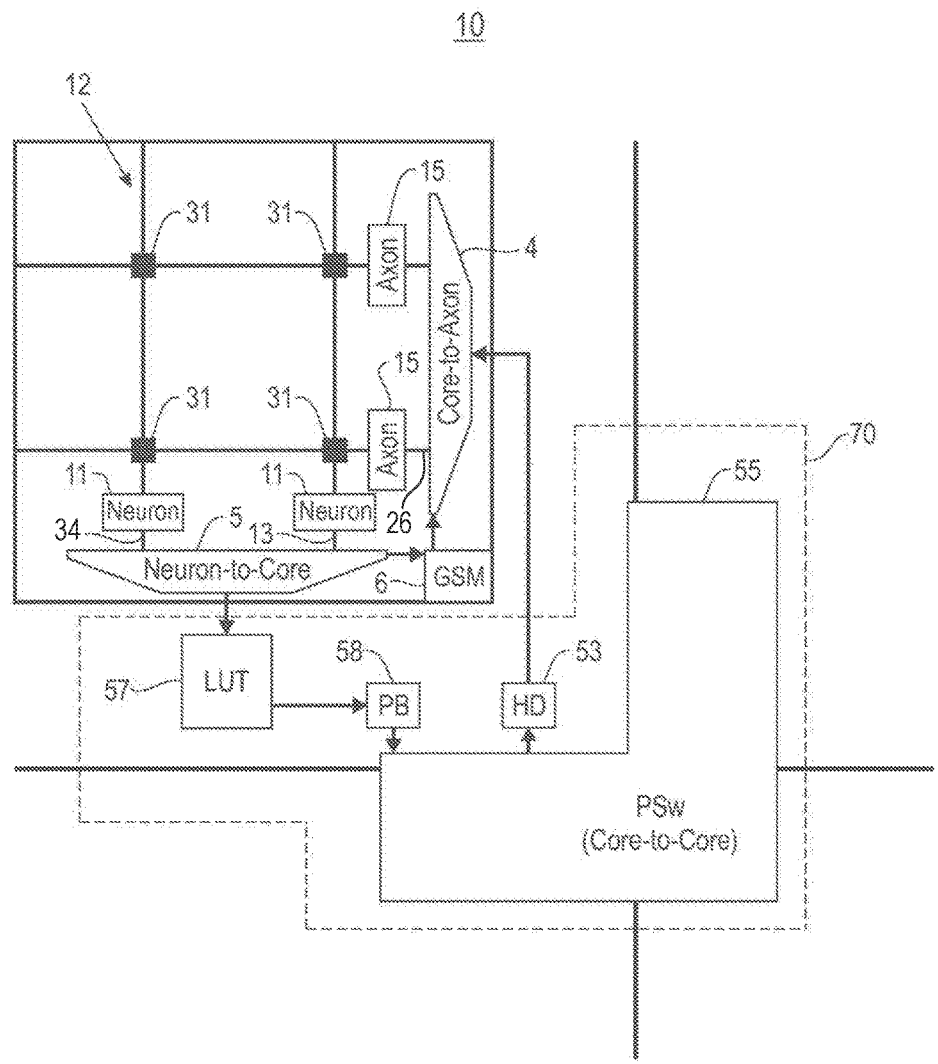
FIG. 1 illustrates an example neurosynaptic core circuit ("core circuit"), in accordance with an embodiment of the invention.

The present invention relates to neuromorphic and synaptronic computation, and in particular, scene understanding using a neurosynaptic system. One embodiment of the invention provides a method for scene understanding based on a sequence of image frames. The method comprises converting each pixel of each image frame to neural spikes, and extracting features from the sequence of image frames by processing neural spikes corresponding to pixels of the sequence of image frames. The method further comprises encoding the extracted features as neural spikes, and classifying the extracted features.

Another embodiment of the invention provides a system for scene understanding based on a sequence of image frames. The system comprises a transduction unit for converting each pixel of each image frame to neural spikes. The system further comprises at least one feature extraction unit for extracting features from the sequence of image frames by processing neural spikes corresponding to pixels of the sequence of image frames. The system further comprises at least one classification unit for encoding the extracted features as neural spikes, and classifying the extracted features.

In one embodiment, a neurosynaptic system comprises a system that implements neuron models, synaptic models, neural algorithms, and/or synaptic algorithms. In one embodiment, a neurosynaptic system comprises software components and/or hardware components, such as digital hardware, analog hardware or a combination of analog and digital hardware (i.e., mixed-mode).

The term electronic neuron as used herein represents an architecture configured to simulate a biological neuron. An electronic neuron creates connections between processing elements that are roughly functionally equivalent to neurons of a biological brain. As such, a neuromorphic and synaptronic computation comprising electronic neurons according to embodiments of the invention may include various electronic circuits that are modeled on biological neurons. Further, a neuromorphic and synaptronic computation comprising electronic neurons according to embodiments of the invention may include various processing elements (including computer simulations) that are modeled on biological neurons. Although certain illustrative embodiments of the invention are described herein using electronic neurons comprising electronic circuits, the present invention is not limited to electronic circuits. A neuromorphic and synaptronic computation according to embodiments of the invention can be implemented as a neuromorphic and synaptronic architecture comprising circuitry, and additionally as a computer simulation. Indeed, embodiments of the invention can take the form of an entirely hardware embodiment, an entirely software embodiment or an embodiment containing both hardware and software elements.

The term electronic axon as used herein represents an architecture configured to simulate a biological axon that transmits information from one biological neuron to different biological neurons. In one embodiment, an electronic axon comprises a circuit architecture. An electronic axon is functionally equivalent to axons of a biological brain. As such, neuromorphic and synaptronic computation involving electronic axons according to embodiments of the invention may include various electronic circuits that are modeled on biological axons. Although certain illustrative embodiments of the invention are described herein using electronic axons comprising electronic circuits, the present invention is not limited to electronic circuits.

FIG. 1 illustrates an example neurosynaptic core circuit ("core circuit") 10, in accordance with an embodiment of the invention. The core circuit 10 comprises a plurality of electronic neurons ("neurons") 11 and a plurality of electronic axons ("axons") 15. The neurons 11 and the axons 15 are interconnected via an m×n crossbar 12 comprising multiple intra-core electronic synapse devices ("synapses") 31, multiple rows/axon paths 26, and multiple columns/dendrite paths 34, wherein "x" represents multiplication, and m and n are positive integers.

Each synapse 31 communicates neuronal firing events (i.e., neural spikes) between an axon 15 and a neuron 11. Specifically, each synapse 31 is located at cross-point junction between an axon path 26 and a dendrite path 34, such that a connection between the axon path 26 and the dendrite path 34 is made through the synapse 31. Each axon 15 is connected to an axon path 26, and sends firing events to the connected axon path 26. Each neuron 11 is connected to a dendrite path 34, and receives firing events from the connected dendrite path 34. Therefore, each synapse 31 interconnects an axon 15 to a neuron 11, wherein, with respect to the synapse 31, the axon 15 and the neuron 11 represent an axon of a pre-synaptic neuron and a dendrite of a post-synaptic neuron, respectively.

Each synapse 31 and each neuron 11 has configurable operational parameters. In one embodiment, the core circuit 10 is a uni-directional core, wherein the neurons 11 and the axons 15 of the core circuit 10 are arranged as a single neuron array and a single axon array, respectively. In another embodiment, the core circuit 10 is a bi-directional core, wherein the neurons 11 and the axons 15 of the core circuit 10 are arranged as two neuron arrays and two axon arrays, respectively. For example, a bi-directional core circuit 10 may have a horizontal neuron array, a vertical neuron array, a horizontal axon array and a vertical axon array, wherein the crossbar 12 interconnects the horizontal neuron array and the vertical neuron array with the vertical axon array and the horizontal axon array, respectively.

In response to the firing events received, each neuron 11 generates a firing event according to a neuronal activation function. A preferred embodiment for the neuronal activation function can be leaky integrate-and-fire.

An external two-way communication environment may supply sensory inputs and consume motor outputs. The neurons 11 and axons 15 are implemented using complementary metal-oxide semiconductor (CMOS) logic gates that receive firing events and generate a firing event according to the neuronal activation function. In one embodiment, the neurons 11 and axons 15 include comparator circuits that generate firing events according to the neuronal activation function. In one embodiment, the synapses 31 are implemented using 1-bit static random-access memory (SRAM) cells. Neurons 11 that generate a firing event are selected one at a time, and the firing events are delivered to target axons 15, wherein the target axons 15 may reside in the same core circuit 10 or somewhere else in a larger system with many core circuits 10.

As shown in FIG. 1, the core circuit 10 further comprises an address-event receiver (Core-to-Axon) 4, an address-event transmitter (Neuron-to-Core) 5, and a controller 6 that functions as a global state machine (GSM). The address-event receiver 4 receives firing events and transmits them to target axons 15. The address-event transmitter 5 transmits firing events generated by the neurons 11 to the core circuits 10 including the target axons 15.

The controller 6 sequences event activity within a time-step. The controller 6 divides each time-step into operational phases in the core circuit 10 for neuron updates, etc. In one embodiment, within a time-step, multiple neuron updates and synapse updates are sequentially handled in a read phase and a write phase, respectively. Further, variable time-steps may be utilized wherein the start of a next time-step may be triggered using handshaking signals whenever the neuron/synapse operation of the previous time-step is completed. For external communication, pipelining may be utilized wherein load inputs, neuron/synapse operation, and send outputs are pipelined (this effectively hides the input/output operating latency).

As shown in FIG. 1, the core circuit 10 further comprises a routing fabric 70. The routing fabric 70 is configured to selectively route neuronal firing events among core circuits 10. The routing fabric 70 comprises a firing events address lookup table (LUT) module 57, a packet builder (PB) module 58, a head delete (HD) module 53, and a core-to-core packet switch (PSw) 55. The LUT 57 is an N address routing table is configured to determine target axons 15 for firing events generated by the neurons 11 in the core circuit 10. The target axons 15 may be axons 15 in the same core circuit 10 or other core circuits 10. The LUT 57 retrieves information such as target distance, direction, addresses, and delivery times (e.g., about 19 bits/packet×4 packets/neuron). The LUT 57 converts firing events generated by the neurons 11 into forwarding addresses of the target axons 15.

The PB 58 packetizes the routing information retrieved by the LUT 57 into outgoing address-event packets. The core-to-core PSw 55 is an up-down-left-right mesh router configured to direct the outgoing address-event packets to the core circuits 10 containing the target axons 15. The core-to-core PSw 55 is also configured to receive incoming address-event packets from the core circuits 10. The HD 53 removes routing information from an incoming address-event packet to deliver it as a time stamped firing event to the address-event receiver 4.

In one example implementation, the core circuit 10 may comprise 256 neurons 11. The crossbar 12 may be a 256×

256 ultra-dense crossbar array that has a pitch in the range of about 0.1 nm to 10 μm. The LUT 57 of the core circuit 10 may comprise 256 address entries, each entry of length 32 bits.

In one embodiment, soft-wiring in the core circuit 10 is implemented using address events (e.g., Address-Event Representation (AER)). Firing event arrival times included in address events may be deterministic or non-deterministic.

Although certain illustrative embodiments of the invention are described herein using synapses comprising electronic circuits, the present invention is not limited to electronic circuits.

Figure 2:
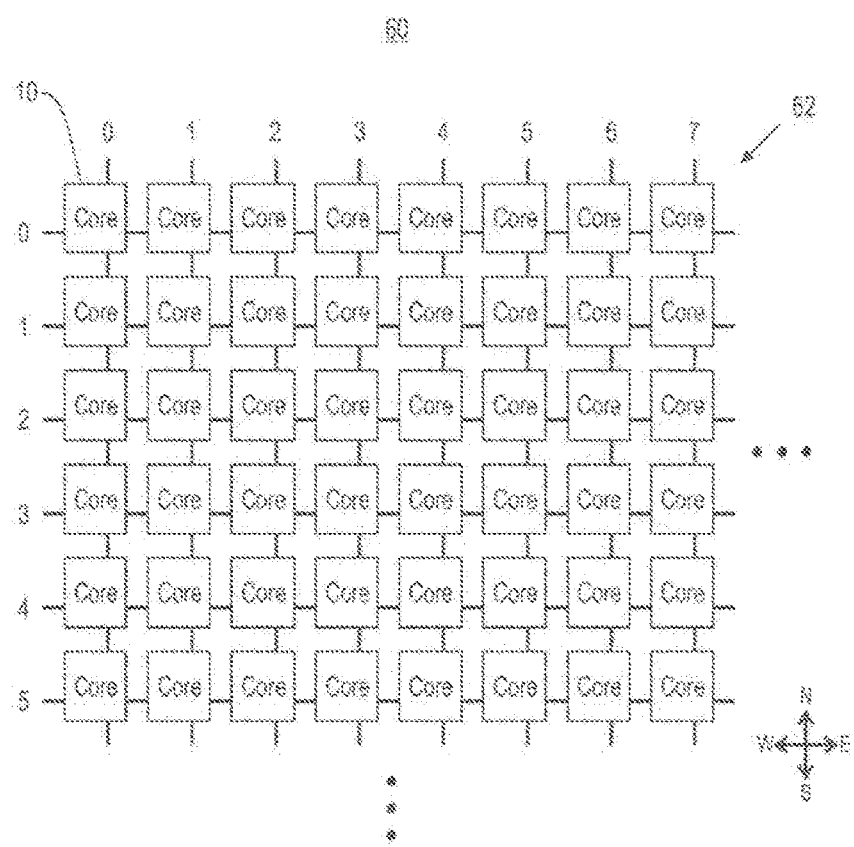
FIG. 2 illustrates an example neurosynaptic network circuit, in accordance with an embodiment of the invention.

FIG. 2 illustrates an example neurosynaptic network circuit 60, in accordance with an embodiment of the invention. The network circuit 60 is an example multi-core neurosynaptic system comprising multiple interconnected core circuits 10. In one embodiment, the core circuits 10 are arranged as a two-dimensional tile-able core array 62. Each core circuit 10 may be identified by its Cartesian coordinates as core (i, j), wherein i is a row index and j is a column index of the core array 62 (i.e., core (0,0), core (0,1), ..., core (5,7)).

Each core circuit 10 utilizes its core-to-core PSw 55 (FIG. 1) to pass along neuronal firing events in the eastbound, westbound, northbound, or southbound direction. For example, a neuron 11 (FIG. 1) of the core circuit (0,0) may generate a firing event targeting an incoming axon 15 (FIG. 1) of the core circuit (5,7). To reach the core circuit (5,7), the firing event may traverse seven core circuits 10 in the eastbound direction (i.e., from core (0,0) to cores (0,1), (0,2), (0,3), (0,4), (0,5), (0,6), and (0,7)), and five core circuits 10 in the southbound direction (i.e., from core (0,7) to cores (1, 7), (2, 7), (3, 7), (4, 7), and (5, 7)) via the core-to-core PSws 55 of the network circuit 60.

Figure 3:
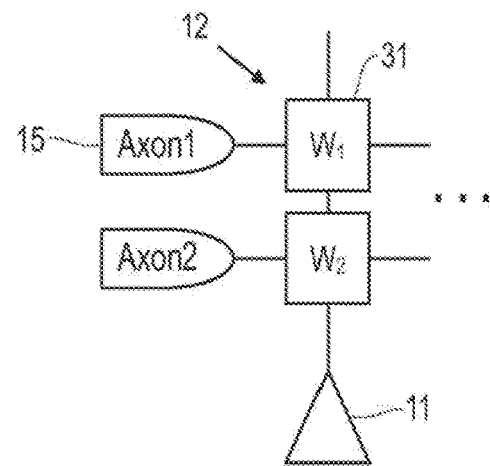
FIG. 3 illustrates a portion of a crossbar, in accordance with an embodiment of the invention.

FIG. 3 illustrates a portion of a crossbar 12, in accordance with an embodiment of the invention. As stated above, a crossbar 12 of a core circuit 10 comprises multiple synapses 31 for interconnecting neurons 11 of the core circuit 10 with axons 15 of the core circuit 10. Each synapse 31 communicates neuronal firing events (i.e., neural spikes) between an axon 15 and a neuron 11. Each synapse 31 has a corresponding synaptic weight. Let $W_i$ generally denote a synaptic weight of a synapse i of the crossbar 12, wherein i is a positive integer. In one embodiment, the synaptic weight of a synapse 31 is binary. In another embodiment, the synaptic weight of a synapse 31 is based on an axon type of an axon 15 connected to the synapse 31.

In one example implementation, the synaptic weight of a synapse 31 may be an integer in the range of [−1, 1]. If a synaptic weight of a synapse 31 is set to '−1', the synapse 31 provides inhibitory synaptic input. If a synaptic weight of a synapse 31 is set to '1', the synapse 31 provides excitatory synaptic input. If a synaptic weight of a synapse 31 is set to '0', the synapse 31 is non-conducting (i.e., turned off).

For example, as shown in FIG. 3, a first synapse 31 with corresponding synaptic weight $W_1$ interconnects a first axon 15 (Axon1) with a first neuron 11. Also shown in FIG. 3, a second synapse 31 with corresponding synaptic weight $W_2$ interconnects a second axon 15 (Axon2) with the first neuron 11.

Figure 4:
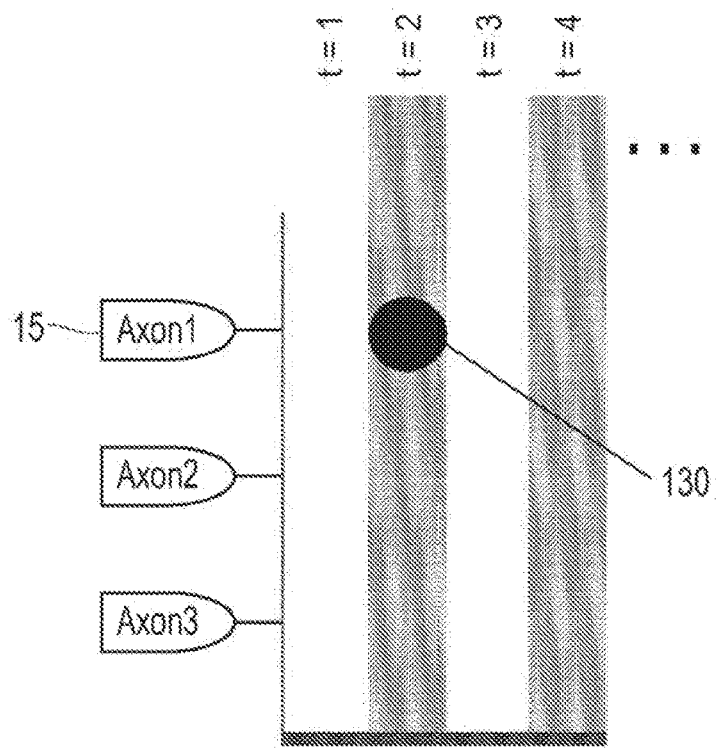
FIG. 4 illustrates a neural spike, in accordance with an embodiment of the invention.

FIG. 4 illustrates a neural spike 130, in accordance with an embodiment of the invention. In one embodiment, all data in a neurosynaptic system is represented as neural spikes 130. A neuron 11 generates a neural spike 130 when a corresponding membrane potential variable of the neuron 11 exceeds a pre-determined threshold. Each neural spike 130 has a corresponding destination and a corresponding delivery time. A corresponding destination for a neural spike 130 represents a target axon 15 that the neural spike 130 is routed to for delivery. A corresponding delivery time for a neural spike 130 represents a time during which the neural spike 130 is scheduled to arrive at its corresponding destination. For example, FIG. 4 illustrates a single neural spike 130 targeting an axon 15 labeled as Axon1. The single neural spike 130 is delivered to Axon1 when time step t=2.

In one embodiment, a neurosynaptic system may be used to perform scene understanding. Scene understanding involves determining regions indicating objects of interest within a visual scene, and classifying the objects of interest.

Figure 5:
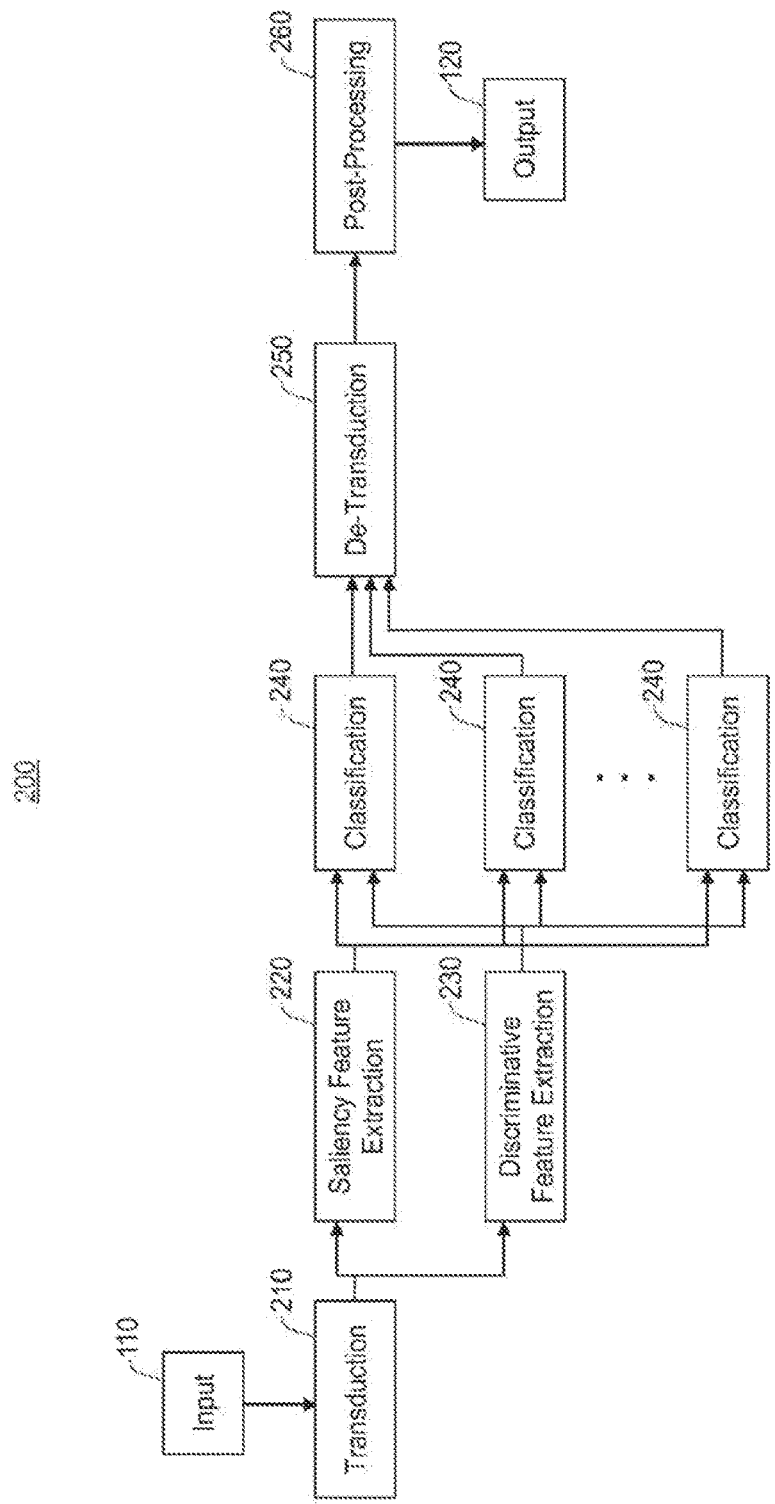
FIG. 5 illustrates an example system for scene understanding, in accordance with an embodiment of the invention.
Figure 9:
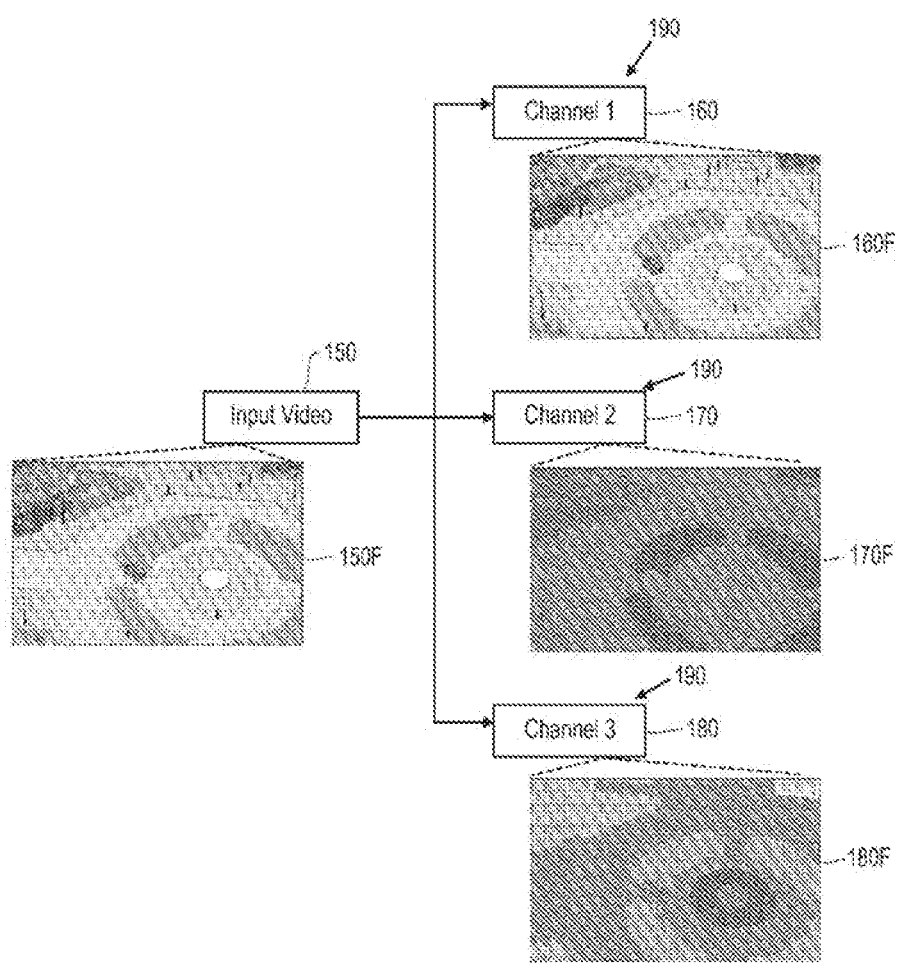
FIG. 9 illustrates pre-processing an input video for feature extraction, in accordance with an embodiment of the invention.

FIG. 5 illustrates an example system 200 for scene understanding, in accordance with an embodiment of the invention. The system 200 is an example neurosynaptic system. In this specification, let the term region of interest denote a portion of a visual scene where one or more objects of interest (e.g., a car, a person walking, etc.) are detected. The system 200 determines one or more regions of interest within each image frame 150F (FIG. 9) of an input video 150 (FIG. 9). The system 200 then classifies the objects of interest within the regions of interest by assigning a classification label to each object of interest. Each classification label represents a predicated classification for the object of interest.

The system 200 receives an input video 150 from an external input system 110 (e.g., sensors, a moving camera, etc.). The input video comprises a sequence of image frames 150F, wherein each image frame 150F represents a visual scene. Each image frame 150F comprises multiple pixels 140 (FIG. 6) arranged in a two-dimensional array. Each pixel 140 has a corresponding pixel intensity value.

In one embodiment, the system 200 comprises a transduction unit 210. The transduction unit 210 pre-processes the input video 150 for feature extraction. As described in detail later herein, the transduction unit 210 converts each pixel 140 of each image frame 150F of the input video 150 to neural spikes 130. The number of neural spikes 130 generated for a pixel 140 is based on a corresponding pixel intensity value of the pixel 140.

The system 200 further comprises a saliency feature extraction unit 220 for extracting one or more salient features from each image frame 150F of the input video 150. As described in detail later herein, the saliency feature extraction unit 220 processes neural spikes 130 for each pixel 140 of each image frame 150F to extract salient features from the image frame 150F. For each image frame 150F, the saliency feature extraction unit 220 generates a corresponding map 410 (FIG. 10) representing the salient features extracted from the image frame 150F as well as the regions of the image frame 150F that the salient features were extracted from. In one embodiment, the salient features extracted include motion saliency features and/or spatial saliency features. Motion saliency features are used to detect objects of interest in motion. Spatial saliency features are used to detect objects of interest that are motionless.

The system 200 further comprises a discriminatory feature extraction unit 230 for extracting one or more discriminative features from each image frame 150F of the input video 150. The discriminatory feature extraction unit 230 processes neural spikes 130 for each pixel 140 of each image frame 150F to extract discriminative features from the image frame 150F. For each image frame 150F, the discriminatory feature extraction unit 230 generates a corresponding map 420 (FIG. 10) representing the discriminative features extracted from the image frame 150F as well as the regions of the image frame 150F that the discriminative features were extracted from.

The features extracted by each feature extraction unit 220, 230 may include mathematically defined features and/or learned features. In one embodiment, mathematically defined features are extracted using one or more of the following: edge extraction operators, texture extraction operators, and local averaging operators. In one embodiment, learned features are extracted using one or more of the following: a k-means clustering algorithm applied to training data, and an input/desired output covariance algorithm applied to training data.

The system 200 further comprises one or more classification units 240. Each classification unit 240 operates as an object classifier. In this specification, let the term patch denote a subset of pixels from the image frame 150F, wherein the size of the patch is smaller than the size of the image frame 150F. In one embodiment, each image frame 150F may be divided into multiple patches 160 (FIG. 7), wherein each patch 160 has a corresponding index i indicating a location of the patch 160 in the image frame 150F, and wherein i is a positive integer. Each patch 160 having index i has a corresponding classification unit 240 for assigning classification labels to features extracted from the patch 160. For each patch 160 of each image frame 150F, a corresponding classification unit 240 for the patch 160 assigns one or more classification labels, based on maps 410 and 420 corresponding to the image frame 150F, to any salient features and discriminative features extracted from the patch 160. The corresponding classification unit 240 only analyzes a portion of the maps 410 and 420 that correspond to the patch 160. In one embodiment, the classification units 240 operate in parallel.

In one embodiment, each classification unit 240 is trained using one of the following training techniques: stochastic gradient descent, a support vector machine, backpropagation, input/desired output covariance, and a restricted Boltzmann machine.

The system 200 further comprises a de-transduction unit 250 for converting neural spikes representing each pixel 140 of each image frame 150F of the input video 150 to pixels 140.

The system 200 further comprises a post-processing unit 260. For each image frame 150F, the post-processing unit 260 merges adjacent patches 160 of the image frame 150F to form a corresponding resulting image frame 150F (FIG. 10) that highlights/flags objects of interest detected within the image frame 150F. The resulting image frame 150F may be provided to an external output system 120 for display (e.g., an external monitor).

Each component of the system 200 (i.e., the transduction unit 210, the saliency feature extraction unit 220, the discriminative feature extraction unit 230, the classification units 240, the de-transduction unit 250, the post-processing unit 260) utilizes one or more core circuits 10 for implementing the functions/operations of the component.

Figure 6:
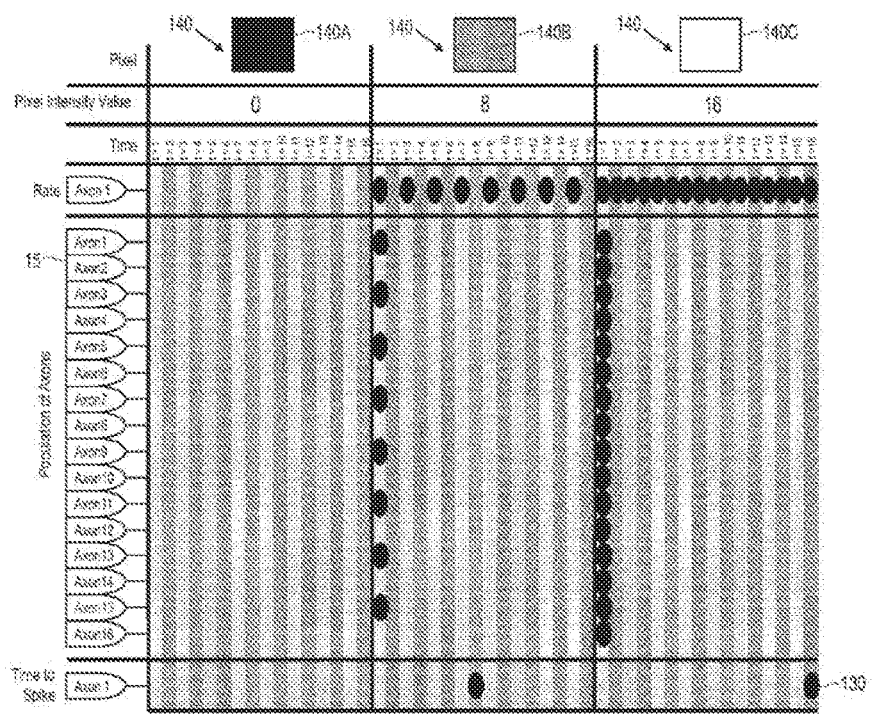
FIG. 6 illustrates converting different pixels into neural spikes, in accordance with an embodiment of the invention.

FIG. 6 illustrates converting different pixels 140 into neural spikes 130, in accordance with an embodiment of the invention. As stated above, each pixel 140 has a corresponding pixel intensity value. FIG. 6 illustrates three pixels 140 with different pixel intensity values: a first pixel 140A with pixel intensity value 0 (e.g., pixel 140A is black), a second pixel 140B with pixel intensity value 8 (e.g., pixel 140B is grayscale), and a third pixel 140C with pixel intensity value 16 (e.g., pixel 140C is white).

The transduction unit 210 converts each pixel 140 of each image frame 150F to neural spikes 130 using a temporal coding scheme. In one embodiment, a rate code temporal coding scheme is utilized, wherein a pixel intensity value of a pixel 140 determines the number of neural spikes 130 that will be sent to an axon 15 representing an input line for the pixel 140 in a specified time window. The mapping of a pixel intensity value to a number of neural spikes 130 may be linear or non-linear. Further, a floor value or ceiling value may be included in the mapping.

For example, as shown in FIG. 6, the number of neural spikes 130 that the first pixel 140A is converted to is zero as the pixel intensity value of the first pixel 140A is zero. The number of neural spikes 130 that the second pixel 140B is converted to is 8 as the pixel intensity value of the second pixel 140B is 8. The number of neural spikes 130 that the third pixel 140C is converted to is 16 as the pixel intensity value of the third pixel 140C is 16.

In one embodiment, each pixel 140 has only one corresponding axon 15 representing an input line for the pixel 140. An axon 15 corresponding to the second pixel 140B will receive 8 neural spikes 130 within a specified time window (e.g., 16 time steps). Similarly, an axon 15 corresponding to the third pixel 140C will receive 16 neural spikes 130 within a specified time window (e.g., 16 time steps).

In another embodiment, each pixel 140 has a population of axons 15 representing an input line for the pixel 140. A population of axons 15 corresponding to the second pixel 140B will receive 8 total neural spikes 130 within a specified time window (e.g., 16 time steps). Similarly, a population of axons 15 corresponding to the third pixel 140C will receive 16 total neural spikes 130 within a specified time window (e.g., 16 time steps).

In another embodiment, a stochastic code temporal coding scheme is utilized, wherein a pixel intensity value of a pixel 140 determines the probability of a neural spike 130 being sent to an axon 15 representing an input line for the pixel 140 in each time step. The mapping of a pixel intensity value to a number of neural spikes 130 may be linear or non-linear. Further, a floor value or ceiling value may be included in the mapping.

In one embodiment, each core circuit 10 of a component of the system 200 operates as follows: each neuron 11 receives synaptic input comprising one or more neural spikes 130 from one or more weighted synapses 31 connected to the neuron 11. The neural spikes received may be generated by other neurons 11 or may be from an external source. Each neural spike received is integrated into a membrane potential variable of the neuron 11 based on the weight of the synapse 31 that the neuron 11 received the neural spike from. Each neuron 11 produces outgoing neural spikes 130 based on the integrated synaptic input and an activation function. In one embodiment, each neuron 11 generates an outgoing neural spike 130 when a membrane potential variable of the neuron 11 exceeds a pre-determined threshold.

In one embodiment, outgoing neural spikes 130 generated by a particular set of neurons 11 within each feature extraction unit 220, 230 are provided as output. The outgoing neural spikes 130 generated by this set of neurons 11 encode salient/discriminative features extracted from an image frame 150F of the input video 150.

In one embodiment, the level of each feature extracted by each feature extraction unit 220, 230 may be represented with outgoing neural spikes 130 using a temporal coding scheme. In one embodiment, a rate code temporal coding scheme is utilized, wherein a level of an extracted feature determines the number of outgoing neural spikes 130 generated by one or more corresponding neurons 11 within a specified time window. The mapping of a level of an extracted feature to a number of outgoing neural spikes 130 may be linear or non-linear. Further, a floor value or ceiling value may be included in the mapping.

In another embodiment, a stochastic temporal coding scheme is utilized, wherein a level of an extracted feature determines the probability of an outgoing neural spike 130 generated by one or more corresponding neurons 11 in each time step. The mapping of a level of an extracted feature to a number of outgoing neural spikes 130 may be linear or non-linear. Further, a floor value or ceiling value may be included in the mapping.

In one embodiment, outgoing neural spikes 130 generated by a particular set of neurons 11 within each classification unit 240 are provided as output. The outgoing neural spikes 130 generated by this set of neurons 11 encode class predictions for a patch 160 of an image frame 150F of the input video 150.

In one embodiment, each classification unit 240 interprets features extracted from a corresponding patch 160 or classification labels assigned to the patch 160 into a human-readable format. For example, for each classification label, the sum of outgoing neural spikes 130 generated for the classification label within a specified time window represents the number of votes for the classification label. The classification label with the most number of votes is interpreted as the predicted classification label.

Figure 7:
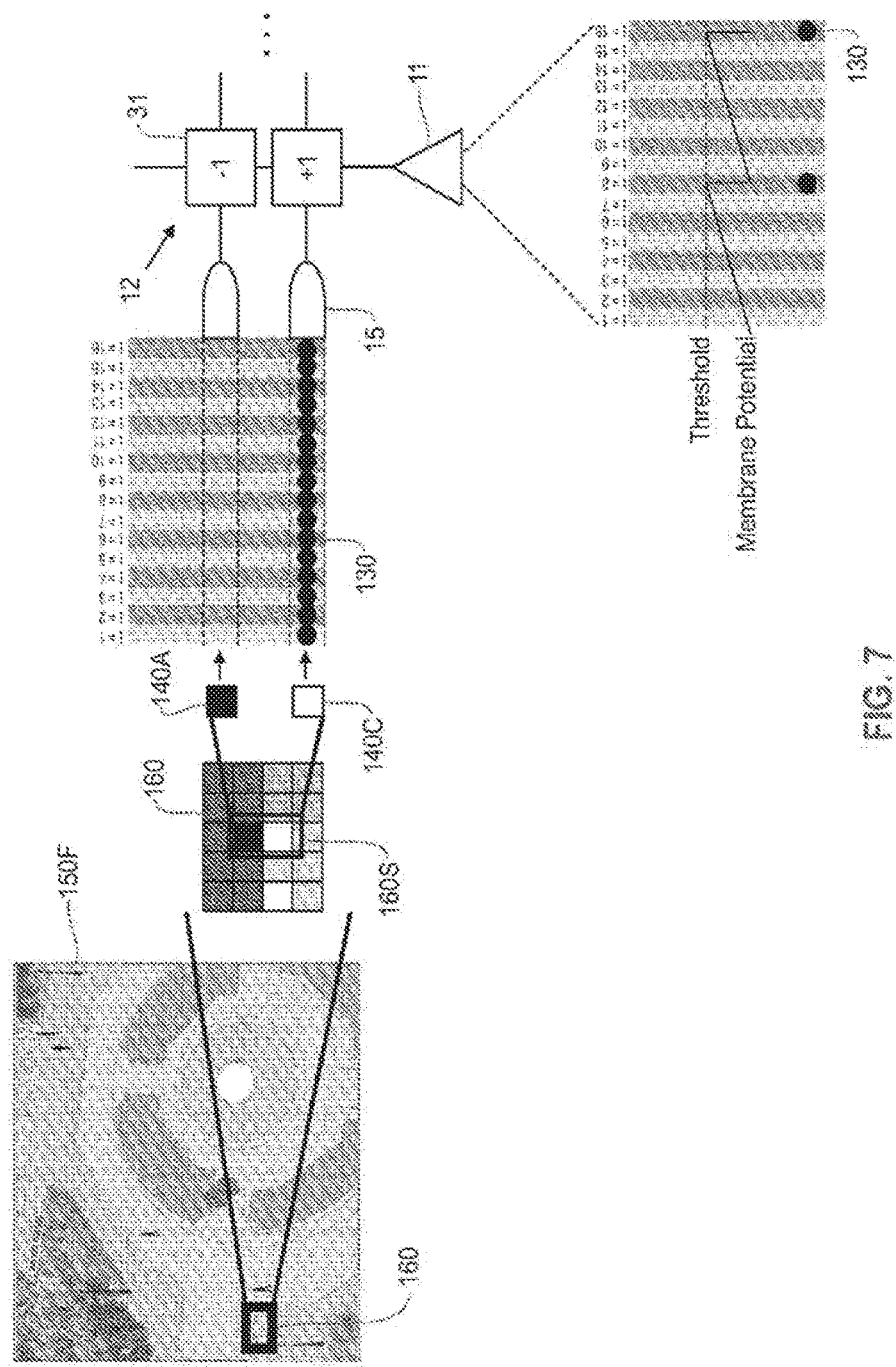
FIG. 7 illustrates converting pixels from an example patch of an image frame to neural spikes, in accordance with an embodiment of the invention.

FIG. 7 illustrates converting pixels from an example patch 160 of an image frame 150F to neural spikes 130, in accordance with an embodiment of the invention. As shown in FIG. 7, a subset 160S of the patch 160 comprises two pixels 140 with different pixel intensity values. The transduction unit 210 converts a first pixel 140A of the subset 160S into zero neural spikes as a pixel intensity value of the first pixel 140A is 0 (e.g., the first pixel 140A is black). The transduction unit 210 converts a second pixel 140C of the subset 160S into 16 neural spikes as a pixel intensity value of the second pixel 140C is 16 (e.g., the first pixel 140C is white).

Each pixel 140 of the subset 160S has only one corresponding axon 15 representing an input line for the pixel 140. An axon 15 corresponding to the second pixel 140C will receive 16 neural spikes 130 within a specified time window (e.g., 16 time steps). The neural spikes 130 representing the second pixel 140C are integrated into a membrane potential variable of a neuron 11 interconnected to the axon 15 via a synapse 31. Each neural spike 130 received is integrated into the membrane potential variable of the neuron 11 based on the weight of the synapse 31. The neuron 11 generates an outgoing neural spike 130 each time the membrane potential variable of the neuron 11 exceeds a pre-determined threshold. For example, as shown in FIG. 7, the neuron 11 generates an outgoing neural spike 130 during time step t=8 and time step t=16.

Figure 8:
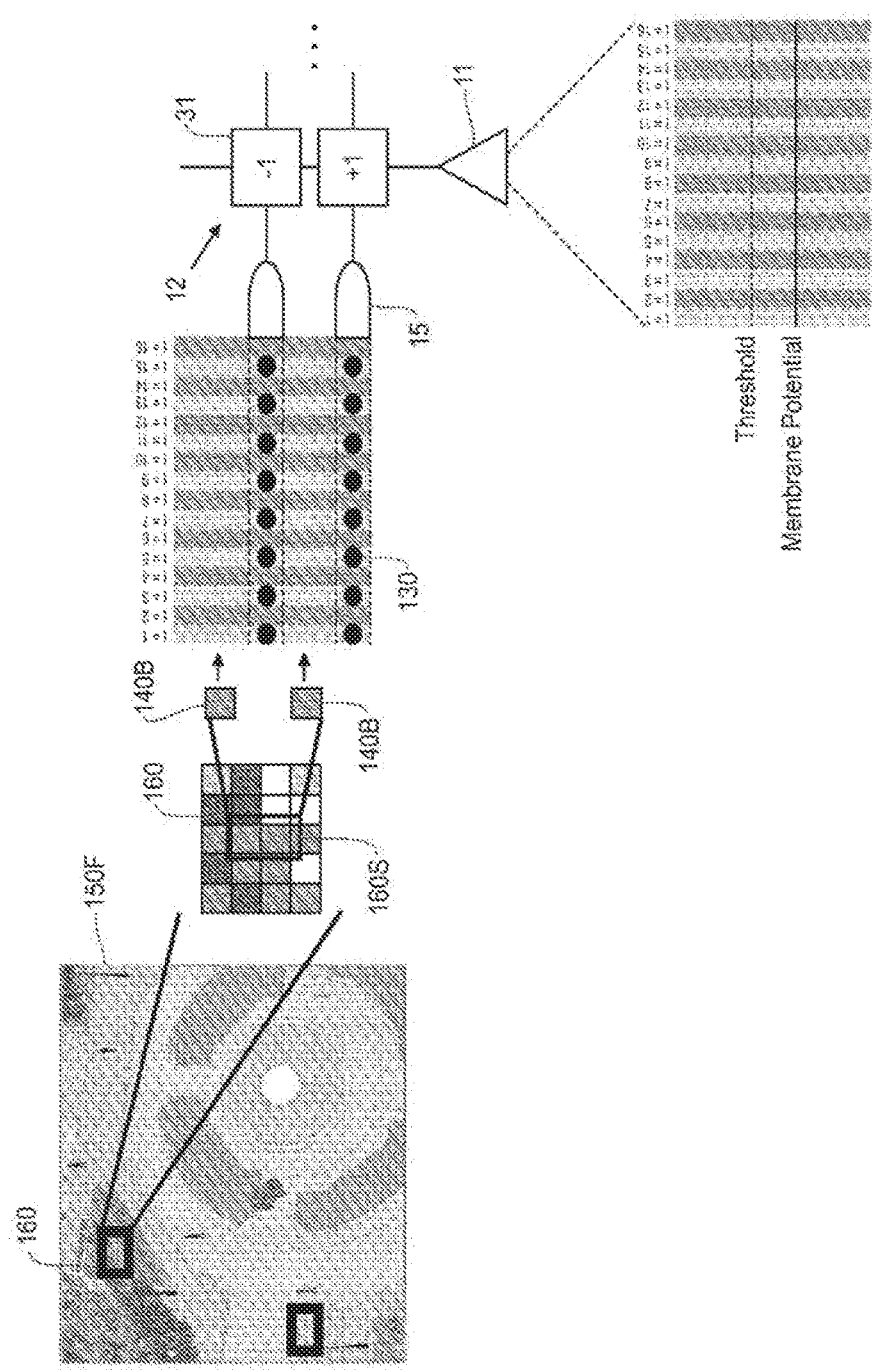
FIG. 8 illustrates converting pixels from another example patch of an image frame to neural spikes, in accordance with an embodiment of the invention.

FIG. 8 illustrates converting pixels from another example patch 160 of an image frame 150F to neural spikes 130, in accordance with an embodiment of the invention. As shown in FIG. 8, a subset 160S of the patch 160 comprises two pixels 140 with the same pixel intensity values. The transduction unit 210 converts each pixel 140B of the subset 160S into eight neural spikes as the pixel intensity value of the pixel 140B is 8 (e.g., the pixel 140B is grayscale).

Each pixel 140B of the subset 160S has only one corresponding axon 15 representing an input line for the pixel 140B. An axon 15 corresponding to each pixel 140B will receive 8 neural spikes 130 within a specified time window (e.g., 16 time steps). The neural spikes 130 representing each pixel 140B are integrated into a membrane potential variable of a neuron 11 interconnected to the axon 15 via one or more synapses 31. Each neural spike 130 received is integrated into the membrane potential variable of the neuron 11 based on the weight of the synapses 31. The neuron 11 generates an outgoing neural spike 130 each time the membrane potential variable of the neuron 11 exceeds a pre-determined threshold. As shown in FIG. 8, the weights of the synapses 31 are opposing. As such, the membrane potential variable of the neuron 11 never exceeds a pre-determined threshold.

FIG. 9 illustrates pre-processing an input video 150 for feature extraction, in accordance with an embodiment of the invention. In one embodiment, the transduction unit 210 converts the input video 150 to a pre-determined color space. Specifically, the transduction unit 210 converts each image frame 150F of the input video 150 to one or more channels 240, wherein each channel corresponds to a dimension of a color space.

For example, in one embodiment, the input video 150 comprises a sequence of image frames 150F in the RGB color space. The transduction unit 210 converts each image frame 150F of the input video 150 from the RGB color space to the L*a*b* color space. Specifically, the transduction unit 210 converts each image frame 150F to three separate channels 190: a first channel 160 ("Channel 1") corresponding to the L* dimension of the L*a*b* color space, a second channel 170 ("Channel 2") corresponding to the a* dimension of the L*a*b* color space, and a third channel 180 ("Channel 3") corresponding to the b* dimension of the L*a*b* color space. In another embodiment, the transduction unit 210 converts each image frame 150F to fewer than, or more than, three separate channels 190.

As stated above, the transduction unit 210 converts each pixel of each image frame 150F of the input video 150 to neural spikes. For example, the transduction unit 210 converts each pixel of each image frame 160F, 170F and 180F of Channel 1, Channel 2 and Channel 3, respectively, to neural spikes.

Figure 10:
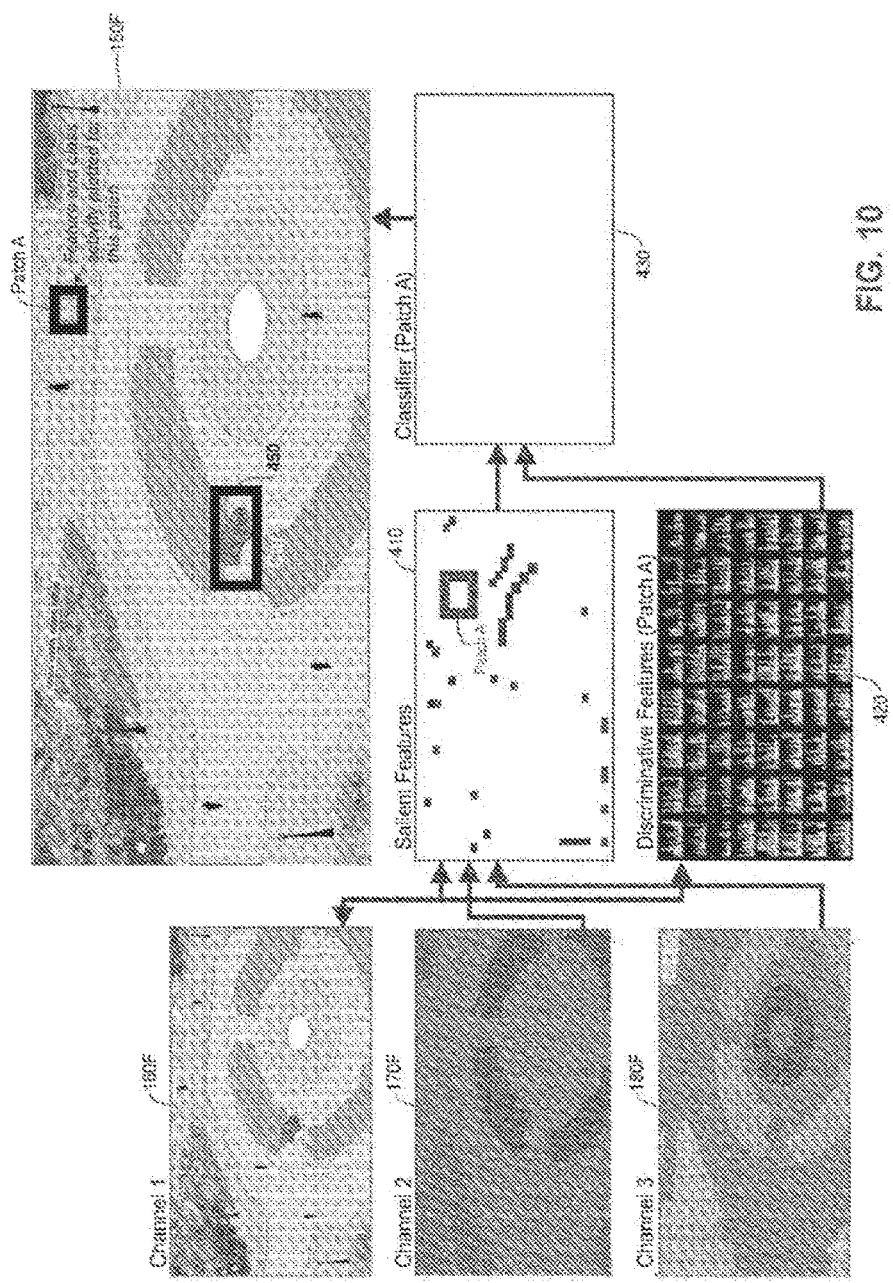
FIG. 10 illustrates performing scene understanding on an image frame, in accordance with an embodiment of the invention.

FIG. 10 illustrates performing scene understanding on an image frame 150F, in accordance with an embodiment of the invention. The saliency feature extraction unit 220 extracts salient features from each image frame 160F of Channel 1, each image frame 170F of Channel 2, and each image frame 180F of Channel 3. In one embodiment, the salient features extracted include motion saliency features and/or spatial saliency features. For each image frame 150F, the saliency feature extraction unit 220 generates a corresponding map 410 representing the salient features extracted from corresponding image frames 160F, 170F and 180F.

Similarly, the discriminative feature extraction unit 230 extracts salient features from each image frame 160F of Channel 1, each image frame 170F of Channel 2, and each image frame 180F of Channel 3. For each image frame 150F, the discriminative feature extraction unit 230 generates a corresponding map 420 representing the discriminative features extracted from corresponding image frames 160F, 170F and 180F.

Each patch 160 of each image frame 150F has a corresponding classification unit 240 for assigning a classification label to salient features and/or discriminative features extracted from the patch 160.

For each image frame 150F, the post-processing unit 260 merges adjacent patches 160 of the image frame 150F to form a corresponding resulting image frame 150F that highlights objects of interest detected within the image frame 150F. For example, as shown in FIG. 10, a car within the image frame 150F is flagged as an object of interest.

Figure 11:
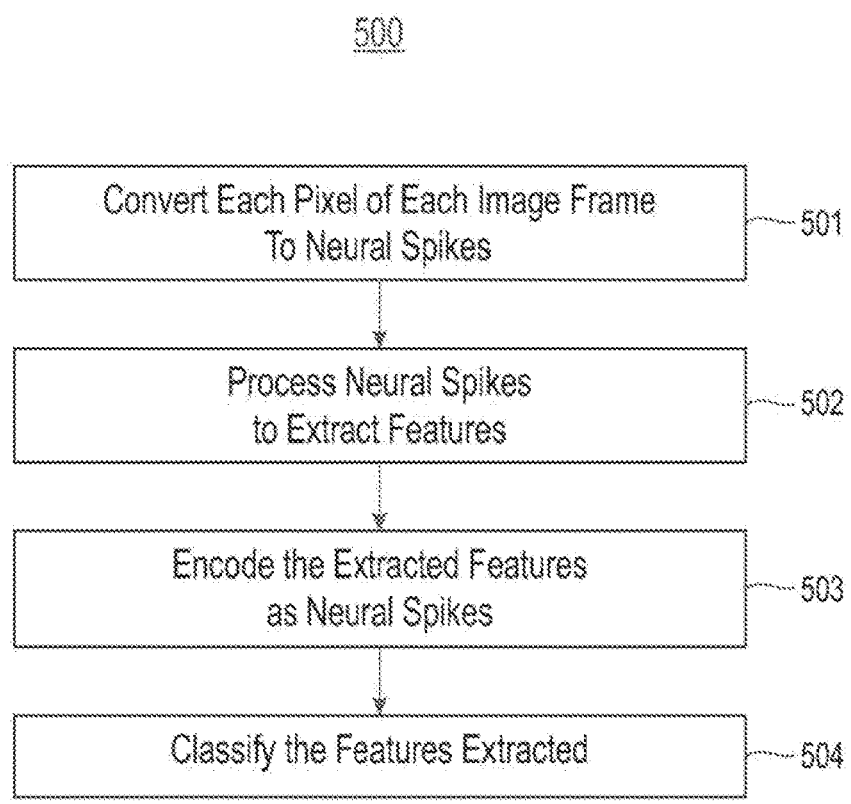
FIG. 11 illustrates a flowchart of an example process for performing scene understanding, in accordance with an embodiment of the invention.

FIG. 11 illustrates a flowchart of an example process 500 for performing scene understanding, in accordance with an embodiment of the invention. In process block 501, convert each pixel of each image frame to neural spikes. In process block 502, process neural spikes to extract salient features. In process block 503, encode the extracted salient features as neural spikes. In process block 504, classify the features extracted.

Figure 12:
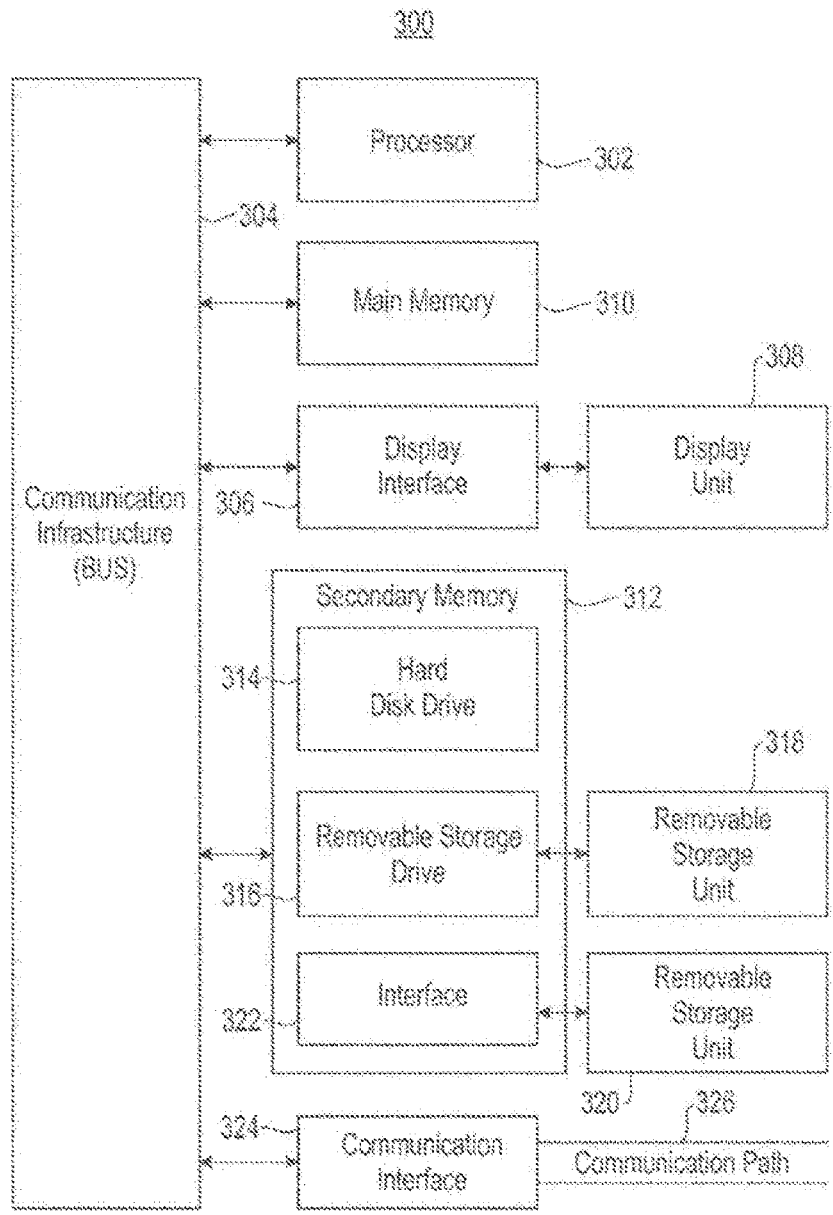
FIG. 12 is a high level block diagram showing an information processing system useful for implementing one embodiment of the present invention.

FIG. 12 is a high level block diagram showing an information processing system 300 useful for implementing one embodiment of the present invention. The computer system includes one or more processors, such as processor 302. The processor 302 is connected to a communication infrastructure 304 (e.g., a communications bus, cross-over bar, or network).

The computer system can include a display interface 306 that forwards graphics, text, and other data from the communication infrastructure 304 (or from a frame buffer not shown) for display on a display unit 308. The computer system also includes a main memory 310, preferably random access memory (RAM), and may also include a secondary memory 312. The secondary memory 312 may include, for example, a hard disk drive 314 and/or a removable storage drive 316, representing, for example, a floppy disk drive, a magnetic tape drive, or an optical disk drive. The removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by removable storage drive 316. As will be appreciated, the removable storage unit 318 includes a computer readable medium having stored therein computer software and/or data.

In alternative embodiments, the secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM, or PROM) and associated socket, and other removable storage units 320 and interfaces 322 which allow software and data to be transferred from the removable storage unit 320 to the computer system.

The computer system may also include a communication interface 324. Communication interface 324 allows software and data to be transferred between the computer system and external devices. Examples of communication interface 324 may include a modem, a network interface (such as an Ethernet card), a communication port, or a PCMCIA slot and card, etc. Software and data transferred via communication interface 324 are in the form of signals which may be, for example, electronic, electromagnetic, optical, or other signals capable of being received by communication interface 324. These signals are provided to communication interface 324 via a communication path (i.e., channel) 326. This communication path 326 carries signals and may be implemented using wire or cable, fiber optics, a phone line, a cellular phone link, an RF link, and/or other communication channels.

In this document, the terms "computer program medium," "computer usable medium," and "computer readable medium" are used to generally refer to media such as main memory 310 and secondary memory 312, removable storage drive 316, and a hard disk installed in hard disk drive 314.

Computer programs (also called computer control logic) are stored in main memory 310 and/or secondary memory 312. Computer programs may also be received via communication interface 324. Such computer programs, when run, enable the computer system to perform the features of the present invention as discussed herein. In particular, the computer programs, when run, enable the processor 302 to perform the features of the computer system. Accordingly, such computer programs represent controllers of the computer system.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

From the above description, it can be seen that the present invention provides a system, computer program product, and method for implementing the embodiments of the invention. The present invention further provides a non-transitory computer-useable storage medium for extracting salient features from video using a neurosynaptic network. The non-transitory computer-useable storage medium has a computer-readable program, wherein the program upon being processed on a computer causes the computer to implement the steps of the present invention according to the embodiments described herein. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
    for an image frame of a sequence of image frames:
        converting, utilizing a first neurosynaptic core circuit, at least one pixel of the image frame to one or more neural spikes;
        processing, utilizing a second neurosynaptic core circuit, the one or more neural spikes to extract one or more salient features from the image frame;
        interpreting the one or more salient features into a human-readable format; and
        classifying an object of interest in the image frame based on the human-readable format;

wherein each neurosynaptic core circuit comprises a plurality of electronic synapse devices interconnecting a plurality of electronic neurons to a plurality of electronic axons.

2. The method of claim 1, further comprising:
assigning one or more classification labels to the one or more salient features utilizing a third neurosynaptic core circuit.

3. The method of claim 2, wherein interpreting the one or more salient features into a human-readable format comprises:
for each classification label, determining a corresponding sum of neural spikes generated by the third neurosynaptic core circuit within a specified time window, wherein the corresponding sum represents a number of votes for the classification label.

4. The method of claim 3, wherein classifying an object of interest in the image frame based on the human-readable format comprises:
classifying an object of interest in the image frame with a classification label having a most number of votes across the one or more classification labels.

5. The method of claim 1, wherein the sequence of image frames comprise a video.

6. A system comprising:
at least one processor; and
a non-transitory processor-readable memory device storing instructions that when executed by the at least one processor causes the at least one processor to perform operations including:
for an image frame of a sequence of image frames:
converting, utilizing a first neurosynaptic core circuit, at least one pixel of the image frame to one or more neural spikes;
processing, utilizing a second neurosynaptic core circuit, the one or more neural spikes to extract one or more salient features from the image frame;
interpreting the one or more salient features into a human-readable format; and
classifying an object of interest in the image frame based on the human-readable format;
wherein each neurosynaptic core circuit comprises a plurality of electronic synapse devices interconnecting a plurality of electronic neurons to a plurality of electronic axons.

7. The system of claim 6, wherein the operations further comprise:
assigning one or more classification labels to the one or more salient features utilizing a third neurosynaptic core circuit.

8. The system of claim 7, wherein interpreting the one or more salient features into a human-readable format comprises:
for each classification label, determining a corresponding sum of neural spikes generated by the third neurosynaptic core circuit within a specified time window, wherein the corresponding sum represents a number of votes for the classification label.

9. The system of claim 8, wherein classifying an object of interest in the image frame based on the human-readable format comprises:
classifying an object of interest in the image frame with a classification label having a most number of votes across the one or more classification labels.

10. The system of claim 6, wherein the sequence of image frames comprise a video.

11. A non-transitory computer-readable medium storing instructions that, when executed by at least one processor of a machine, cause the machine to perform operations comprising:
for an image frame of a sequence of image frames:
converting, utilizing a first neurosynaptic core circuit, at least one pixel of the image frame to one or more neural spikes;
processing, utilizing a second neurosynaptic core circuit, the one or more neural spikes to extract one or more salient features from the image frame;
interpreting the one or more salient features into a human-readable format; and
classifying an object of interest in the image frame based on the human-readable format;
wherein each neurosynaptic core circuit comprises a plurality of electronic synapse devices interconnecting a plurality of electronic neurons to a plurality of electronic axons.

12. The computer program product of claim 11, wherein the operations further comprise:
assigning one or more classification labels to the one or more salient features utilizing a third neurosynaptic core circuit.

13. The computer program product of claim 12, wherein interpreting the one or more salient features into a human-readable format comprises:
for each classification label, determining a corresponding sum of neural spikes generated by the third neurosynaptic core circuit within a specified time window, wherein the corresponding sum represents a number of votes for the classification label.

14. The computer program product of claim 13, wherein classifying an object of interest in the image frame based on the human-readable format comprises:
classifying an object of interest in the image frame with a classification label having a most number of votes across the one or more classification labels.

15. The computer program product of claim 11, wherein the sequence of image frames comprise a video.

* * * * *